US008875142B2

(12) United States Patent  
Shivanna et al.

(10) Patent No.: US 8,875,142 B2  
(45) Date of Patent: Oct. 28, 2014

(54) JOB SCHEDULING ON A MULTIPROCESSING SYSTEM BASED ON RELIABILITY AND PERFORMANCE RANKINGS OF PROCESSORS AND WEIGHTED EFFECT OF DETECTED ERRORS

(75) Inventors: Suhas Shivanna, Bangalore (IN); Karthik Krishnapuram Ranganathan, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 710 days.

(21) Appl. No.: 12/604,568

(22) Filed: Oct. 23, 2009

(65) Prior Publication Data  
US 2010/0205607 A1 Aug. 12, 2010

(30) Foreign Application Priority Data

Feb. 11, 2009 (IN) .............................. 292/CHE/2009

(51) Int. Cl.  
G06F 9/48 (2006.01)  
G06F 9/50 (2006.01)  
G06F 11/00 (2006.01)  
G06F 11/07 (2006.01)  
G06F 11/30 (2006.01)  
G06F 11/34 (2006.01)

(52) U.S. Cl.  
CPC .......... *G06F 9/4881* (2013.01); *G06F 11/0715* (2013.01); *G06F 11/3024* (2013.01); *G06F 11/0724* (2013.01); *G06F 9/505* (2013.01); *G06F 11/0781* (2013.01); *G06F 11/3055* (2013.01)  
USPC ................. 718/102; 718/100; 714/1; 714/10; 714/11; 714/E11.02; 714/E11.021

(58) Field of Classification Search  
None  
See application file for complete search history.

(56) References Cited

U.S. PATENT DOCUMENTS

| | | | | |
|---|---|---|---|---|
| 5,517,200 A | * | 5/1996 | McAdam et al. | 342/360 |
| 7,099,942 B1 | * | 8/2006 | Wilson et al. | 709/224 |
| 2002/0133759 A1 | * | 9/2002 | Bailey et al. | 714/54 |
| 2005/0066239 A1 | * | 3/2005 | Keeton et al. | 714/47 |
| 2005/0186831 A1 | * | 8/2005 | Barsun et al. | 439/362 |
| 2005/0246581 A1 | * | 11/2005 | Jardine et al. | 714/12 |
| 2006/0010344 A1 | * | 1/2006 | Zorek et al. | 714/13 |
| 2006/0184939 A1 | * | 8/2006 | Sahoo et al. | 718/100 |
| 2007/0043571 A1 | * | 2/2007 | Michelini et al. | 704/270.1 |
| 2007/0043975 A1 | * | 2/2007 | Varadarajan et al. | 714/25 |
| 2007/0088974 A1 | * | 4/2007 | Chandwani et al. | 714/6 |
| 2008/0005538 A1 | * | 1/2008 | Apparao et al. | 712/220 |
| 2008/0005539 A1 | * | 1/2008 | Velhal et al. | 712/220 |
| 2008/0021994 A1 | * | 1/2008 | Grelewicz et al. | 709/224 |
| 2008/0030764 A1 | * | 2/2008 | Zhu et al. | 358/1.15 |
| 2008/0115010 A1 | * | 5/2008 | Rothman et al. | 714/10 |
| 2008/0250420 A1 | * | 10/2008 | Berstis et al. | 718/104 |
| 2009/0113438 A1 | * | 4/2009 | Barness et al. | 718/103 |
| 2009/0288092 A1 | * | 11/2009 | Yamaoka | 718/104 |

* cited by examiner

*Primary Examiner* — Emerson Puente  
*Assistant Examiner* — Benjamin Wu

(57) ABSTRACT

A multi processor computing system managing tasks based on the health index of the plurality of processors and the priority of tasks to be scheduled. The method comprise receiving the tasks to be scheduled on the computing system; preparing a queue of the tasks based on a scheduling algorithm; computing a health index value for each processor of the computing system; and scheduling the tasks on processors based on the health index value of the processors. A task from a processor with a lower health index may be moved to an available processor with a higher health index.

9 Claims, 4 Drawing Sheets

JOB SCHEDULING ON A MULTIPROCESSING SYSTEM BASED ON RELIABILITY AND PERFORMANCE RANKINGS OF PROCESSORS AND WEIGHTED EFFECT OF DETECTED ERRORS

BACKGROUND OF THE INVENTION

Recent years have seen a continued pattern of development in the computer field. In that regard, considerable effort has been directed to multi processor computing system. Such systems involve a plurality of processors or function units capable of independent operation to process separate tasks in parallel. Usually, the tasks relate to a specified job. Typically, a multi processor computing system includes a plurality of computational units, a memory, a control and at least one input-output processor.

High performance computer systems may utilize multiple processors to increase processing power. Processing workloads may be divided and distributed among the processors, thereby reducing execution time and increasing performance. For example, some computer systems are now provided with processors that include multiple processing cores, each of which may be capable of executing multiple execution threads.

Similarly, single-core and/or multi-core computer systems may be combined into multiprocessor computer systems, which are often used in computer servers. One architectural model for high performance multiple processor computer system is the cache coherent Non-Uniform Memory Access (ccNUMA) model. Under the ccNUMA model, system resources such as processors and random access memory may be segmented into groups referred to as Locality Domains, also referred to as "nodes" or "cells". Another architectural model for high performance multiple processor computer system is the distributed memory computing model where nodes are interconnected with each other by a high performance interconnect or by Ethernet. In both models, each node may comprise one or more processor cores and physical memory. A processor core in a node may access the memory in its node, referred to as local memory, as well as memory in other nodes, referred to as remote memory.

Multi-processor computer systems may be partitioned into a number of elements also called cells or virtual machines. Each cell includes at least one, and more commonly a plurality, of processors. The various cells in a partitioned computer system may run different operating systems, if desired.

Generally in multi processor computers, tasks are scheduled by a task scheduler. A task scheduler is a device which determines the priority and order of execution of several simultaneous task requests and gives the "winning" task a signal to proceed.

The components in a multi processor system are prone to errors and/or failures. Self healing actions like dynamic processor resiliency for processor related errors and dynamic memory resiliency for memory related errors are performed by diagnostic agents running on the operating system. However when some of these self healing actions are taken, it comes to a cost of performance.

BRIEF DESCRIPTION OF THE DRAWINGS

Embodiments of the present invention are illustrated by way of an example and not limited to the figures of the accompanying drawings, in which like references indicate similar elements and in which.

Other features of the present embodiments will be apparent from the accompanying drawings and from the detailed description that follow.

DETAILED DESCRIPTION OF THE INVENTION

A system and method of scheduling task in a multi processor system is described. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims. The methods described herein may be embodied as logic instructions on a computer-readable medium. When executed on a processor, the logic instructions cause a general purpose computing device to be programmed as a special-purpose machine that implements the described methods. The processor, when configured by the logic instructions to execute the methods recited herein, constitutes structure for performing the described methods.

Figure 1:
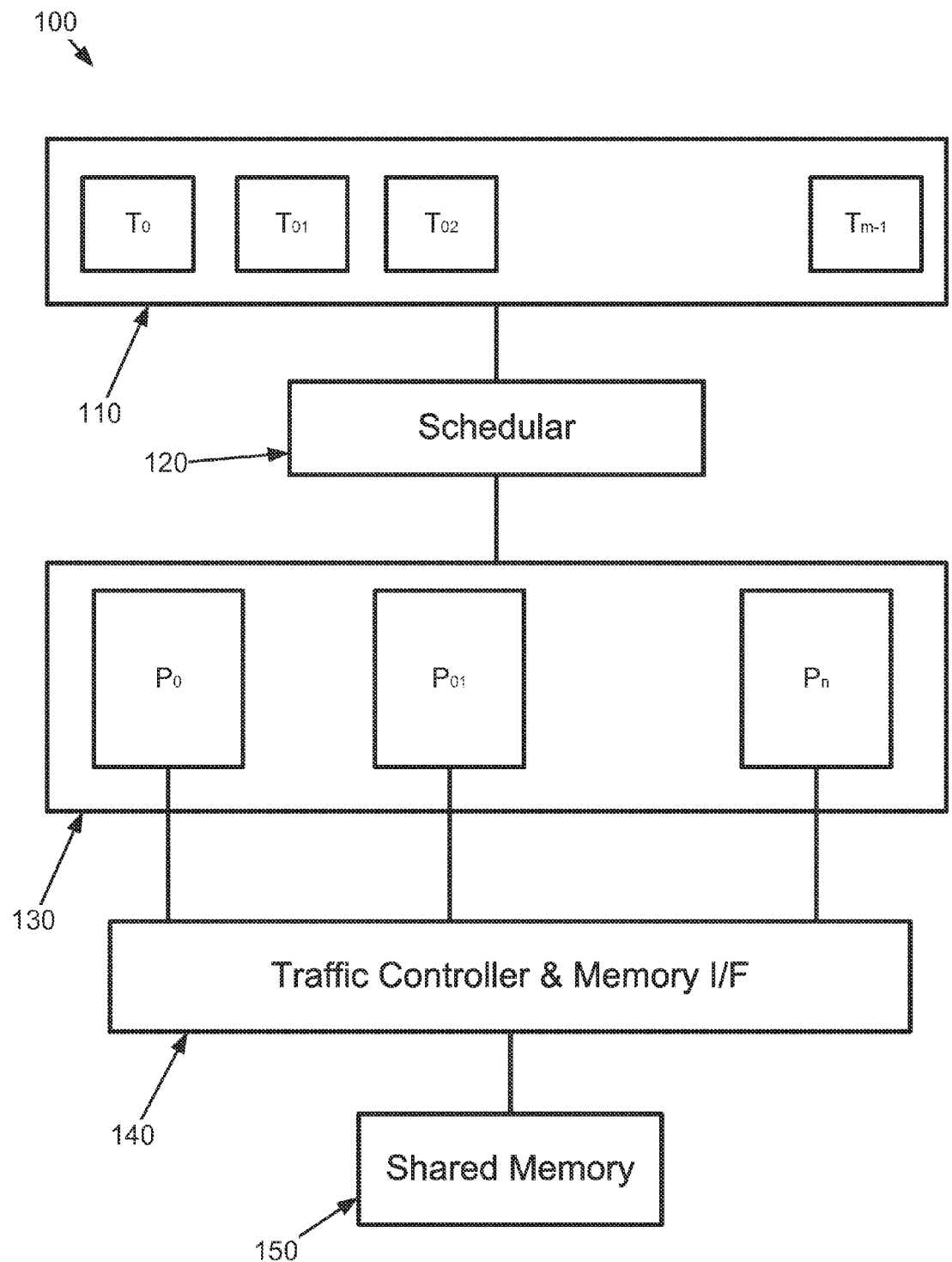
FIG. 1 illustrates a block diagram of multi processor computing system using a scheduler to schedule tasks over multiple processors.

FIG. 1 illustrates a general block diagram of a multi processor computing system 100. The multi processor computing system 100 comprises a memory for receiving the plurality of tasks 110, plurality of processors 130, a scheduler 120, a traffic controller memory & memory interface 140 and a shared memory 150. The multi processor computing system may also comprise several other components like fabric interconnect, core electronic complex chip for example which are not shown in FIG. 1.

The memory 110 may be a non-volatile memory for temporarily receiving and storing the plurality of tasks to be executed on the multi processor computing system 100. For example the memory 110 may store a plurality of tasks $T_1$, $T_2, \ldots, T_{m-1}$. A task is a set of program instructions that are loaded in a memory. For a computer system the task set Ti ($0 \le i \le m-1$) may be known and for each task the task priority information may be known or can be approximated. All tasks are ready to execute and that the execution of the tasks are not interdependent, that is execution of a task $T_2$ is not dependent upon the execution of task $T_1$. Although the dependence between tasks may be incorporated into scheduling, if desired.

The scheduler 120 may be a software component that provides the ability to schedule the launch of tasks or scripts at predefined or specified time intervals. The scheduler typically provides a graphical user interface and a single point of control for definition and monitoring of task execution in a computing system. The basic features of a scheduler may comprise automatic submission of tasks, an interface to monitor the execution of the tasks, and queues to control the execution order of unrelated tasks. The scheduler may use various scheme to decide which particular task to run. The various schemes may comprise task priority, computational resource availability, estimated execution time, elapsed execution time, and the like.

The plurality of processor 130 is a group of processors having two or more processors $P_1$ through $P_n$. The plurality of processors may be the physical processors and/or logical processors. In an example of a multi processor computing system all the processors may be equal or some may be reserved for special purpose. The multiple processors may be coupled to each other at the bus level. These processors may have access to a central shared memory or may participate in a memory hierarchy with both local and shared memory. In another example of a multi processor computing system all of the processors may be placed on a single chip.

The traffic controller and memory interface 140 provide means for processors to connect to a variety of external devices. The traffic controller and memory interface 140 may manage the flow of data going to and from the memory. The shared memory 150 is typically a large block of random access memory that can be accessed by several processors in a multi processor computing system. In an example embodiment, the shared memory 150 may be in addition to each processors limited non-shared private memory. The access to a shared memory may be slower than that of non-shared private memory.

Figure 2:
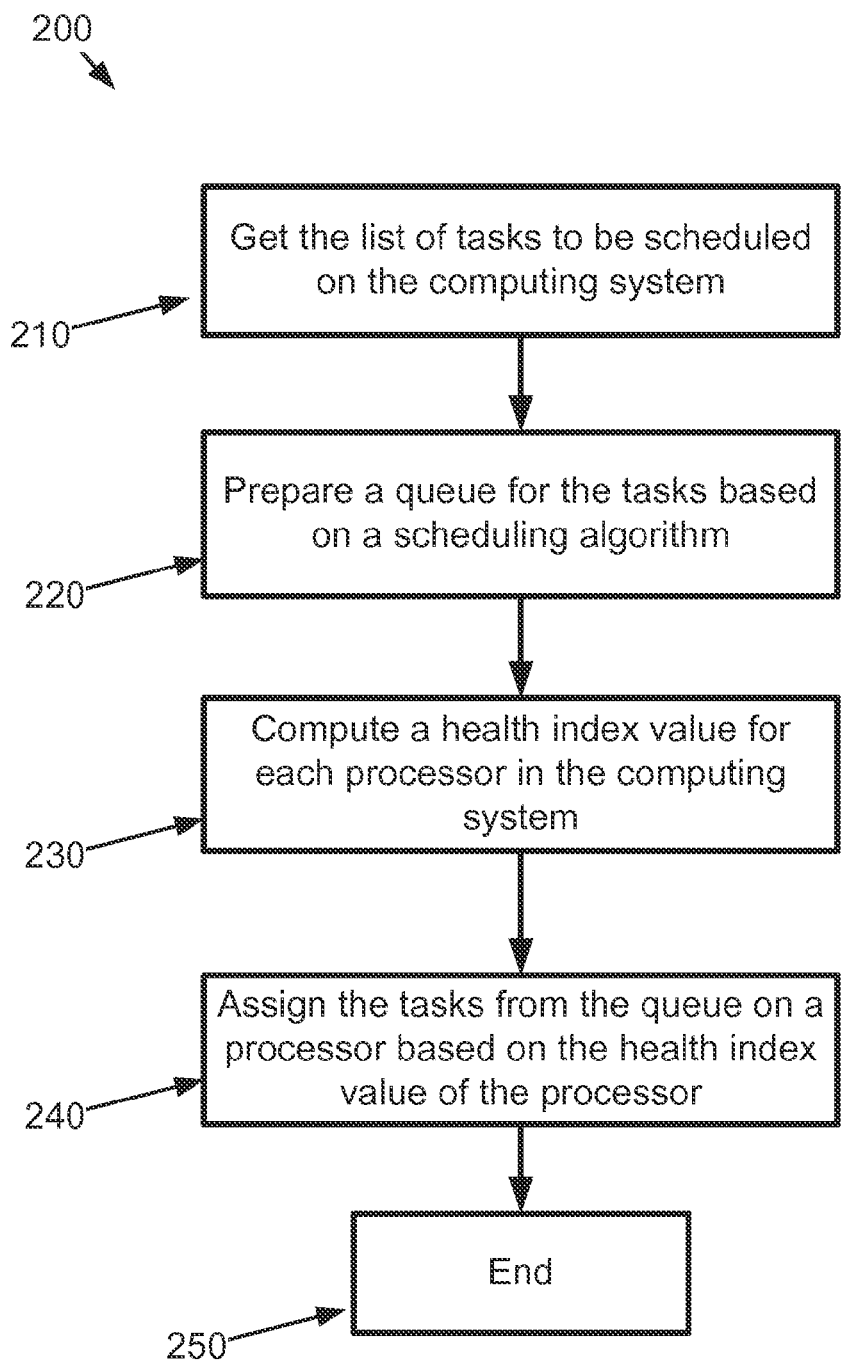
FIG. 2 is a flow diagram illustrating steps involved in scheduling of tasks in a multi processor computing system.

FIG. 2 illustrates a flow diagram of a method 200 for scheduling tasks in a multi processor computing system based on a health index of the plurality of processors. The task in a computing system may be scheduled by a task scheduler based on a set of rules defined by the system administrator. The present invention proposes a method 200 of scheduling tasks using the health information of the plurality of processors in a multi processor computing system. At step 210 of FIG. 2, the method 200 may get a list of all the tasks to be scheduled on the multi processor computing system. The list of the tasks to be scheduled may be obtained from the memory 110.

At step 220 of FIG. 2, the method 200 may prepare a task queue for the tasks to be scheduled on the computing system. The task queue may be prepared by sorting tasks based on a scheduling algorithm. The scheduling algorithm for preparing the task queue may be selected from a list of scheduling algorithm by a system administrator. As an example, the queue may be prepared using a round-robin scheduling algorithm in which each task is given equal time (for instance 1 ms, usually between 1 ms and 100 ms) in a cycling list. So, task A executes for 1 ms, then task B, then task C, then back to task A. As another example the task queue may be prepared by sorting tasks based on a priority associated with each task. The task with the highest priority is placed at the beginning of the task queue while the task with lowest priority is placed at the end of the priority queue. The priority may also be obtained from the operating system.

At step 230 of FIG. 2, the method 200 may compute a health index value for the plurality of processors on the computing system. The health index value for the plurality of processors may be calculated by a hardware or software diagnostic application. A method for calculating the health index value of the plurality of processors in the multi processing computing system is described with respect to FIG. 3.

At step 240 of FIG. 2, the method 200 may schedule the tasks in the task queue based on the health index value of the processors. As an example, the scheduler may schedule the tasks based on the number of the tasks in the task queue and the health index value of the plurality of processors in the computing system. A processor with a less than the normal health index value may have fewer number of tasks scheduled on it compared to a processor with a normal health index value. As an example, if there are 5 tasks to be scheduled and there are 6 available processors in a computing system, then no task may be scheduled on the processor with the lowest health index value.

According to an example embodiment, the scheduler may schedule tasks based on the priority of the tasks in task queue and the health index value of the processors in the computing system. A low priority task may be scheduled on a processor with a low health index value. The task with the highest priority in the task queue may be assigned to a processor with the highest health index value. The task with second highest priority may be schedule on a processor which has the highest health index in the remaining set of processors and so on. The scheduler may sort the processors in a decreasing order of their health index value. The scheduler may also sort the tasks to be scheduled in decreasing order based on the priority of the tasks. The scheduler then may use the above sorted list to assign the tasks on the processors. If there is more than one processor with the same health index value then the scheduler may schedule tasks randomly on processors with same health index value. If the health index value of all the processors are a computing system is equal then the tasks may be randomly scheduled on all processors.

According to an example embodiment, if a task is scheduled on a processor with a low health index value, it may be rescheduled on another processor with a higher index value, if such processor is not processing any task. Before rescheduling the task to a new processor the scheduler may determine an estimated time required for processing of the job, estimated time required for moving the resources required for processing of the job and the estimated time required for context switching. As an example there are three tasks A, B and C in decreasing order of priority, A having the highest priority and C the lowest, to be scheduled on a computing system. The computing system comprises three processors out of which one processor has a low health index value. According to the priority based scheduling the task C may be scheduled on the processor with the low health index value. As soon as a healthy processor gets free and is available for tasks to be scheduled on it the process C may be moved to the healthy processor.

According to an example embodiment, the rescheduling and change to the scheduling process based on the health index may be configurable. The rescheduling may be triggered only when a particular failure is detected in the system which may reduce the health index value below a predetermined value. The configuration of rescheduling may reduce the overhead required in scheduling the task when the computing system has all the processors with a normal health index value.

Figure 3:
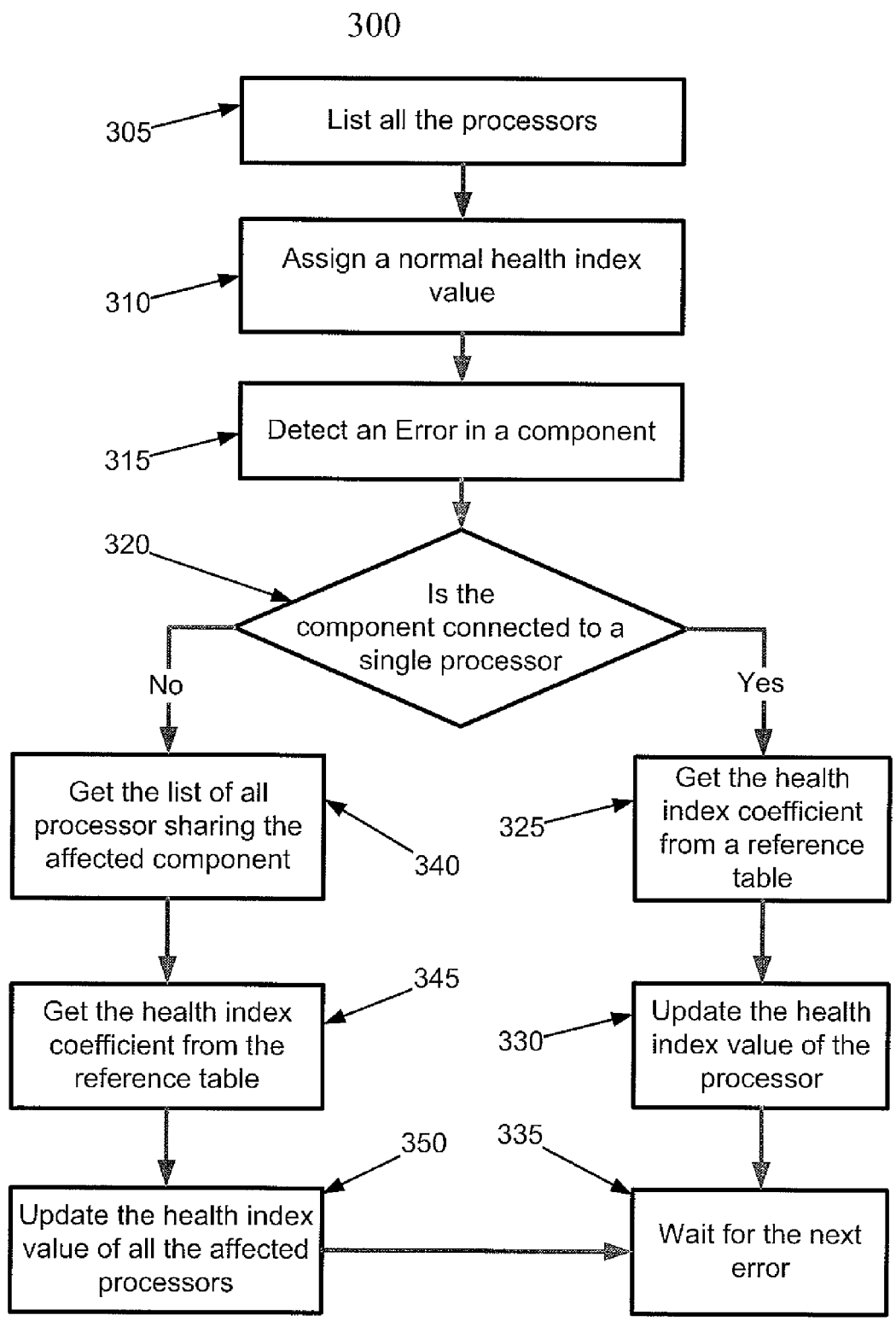
FIG. 3 is a flow diagram illustrating steps of an algorithm for calculating health index value of processors in a multi processor computing system.

FIG. 3 illustrates steps for a method 300 for calculating the health index value of plurality of processors in a multi processor computing system, in an example embodiment of the invention. The health index value is a measure of the failure history of a processor and other hardware components connected to the said processor. On a healthy computing system all the processors may have the same health index value, indicating a normal health. When a processor or a related component starts experiencing errors, the health index value may change based on the severity of the errors. The degradation in the health index value of a processor may be linear and based on the severity of the error. As an example an L4 cache disabled processor may have a health index value of 0.8 on a scale of 0-1. As another example a L3 and L4 cache disabled processor may have a health index value of 0.7 on a scale of 0-1. The degradation in the health index value may be calculated using other mathematical equations.

At step 310 of FIG. 3, the method of calculating health index value may start with the listing of all the processors on the multi processor computing system. The processors and the components in a computing system may be identified by a hardware ID also referred to as logical ID. The list of processors may be obtained by system hardware management services running on the computing system. The hardware management services in a computing system may store the list of hardware in the system and an associated hardware ID for each hardware. This list may comprise processors which are capable of processing task. At step 315 of FIG. 3, the method may assign a nominal health index value to all the processors. The nominal value may represent a healthy processor. As an example a healthy processor may be assigned a health index value of 1. The nominal value may be assigned in terms of percentage with 100 for healthy processor. The nominal health value may also be predetermined by a system administrator.

At step 320, a diagnostic system running on the computing system may detect an error in a hardware component. The diagnostic system maintains a list of basic health status of the processors and the components in a computing system. At step 325, the method may determine whether the erroneous component is connected to a processor. The erroneous component may be connected directly or indirectly to the processor. The component connectivity information may be obtained from the system management software running on the system.

At step 325 if the erroneous component is connected to a single processor, the method may identify the affected processor. The affected processor may be obtained using the connectivity information. The method may obtain a health index coefficient for the detected error from a health index coefficient mapping table and update the health index value of the affected processor. The health index coefficient mapping table consists of a mapping between the hardware error and a health index coefficient corresponding to the hardware error. The health index coefficient for each hardware error may be predetermined by the system administrator based on the severity of the hardware error and the effect of the hardware error on the functioning of the computing system. The health index coefficient may also depend on the repetition of the error on a hardware component. At step 330 of FIG. 3, the method may add the health index coefficient of the detected error to the health index value of the processor to obtain the updated health index value. At step 335, the method may wait for the next error detection. The processor may be notified of the change in the health index value of the processor.

At step 340 of FIG. 3, if the erroneous component is connected to more than one processor the method may identify all affected processors in the computing system. The method at step 345, may obtain a health index coefficient for the detected error from the health index mapping table. At step 350, the method 300, may update the health index value of all the affected processors by adding the health index coefficient of the detected error to the existing health index value. The scheduler may be notified for the change in the health index value of the processors.

As an example, if there are failures which affects multiple processor cores, then the health index value of each processor core will be changed based on the severity of error. A potential failure in a processor chip may result in reduction in the health of all the individual processor cores contained on the same processor chip which may be reflected by the health index value of the individual processor cores. As an example a failure in common component like fabric interconnect link and core electronic complex chip may result in performance degradation of more than one processor. As an example a continuous correctable error in a fabric interconnect between a processor and a memory may result in self healing action which may involve a speed reduction of the fabric interconnect. If the error exceeds a predefined threshold, the fabric interconnect is restrained at a lower frequency. The speed reduction may lead to a greater memory fetch times for the processors forcing them to operate at slower rate.

When an erroneous component is replaced with a new component, in the computing system, the health index value of the processor connected to the component may be recalculated. The newly added component may be assumed as a healthy component and hence is assigned normal health index coefficient. The health index value of all processors which are connected to a replaced component may be updated accordingly. When a processor chip is replaced with a new one, the health index value of all the processors on that processor chip may be reset to a normal health index value. When only one processor is replaced with a new one, the health index value of the processor may be reset to a normal value. Also when the erroneous component is serviced for the error and/or goes through a healing process, the health index value of the processors may be updated.

The health index value for all the processors may be updated dynamically at the time of detection of an error and/or the healing of the error in a hardware component. The scheduler may be notified for any change in the health index value of a processor and the updated health index value is made available. The health index value for the processors is maintained with the computing system and may be accessed by the scheduler. The health index value may be stored in the computing system memory. The scheduler may use the updated health index value to effectively schedule the tasks on the processors.

According to an example embodiment, the health index value may be used to notify the system administrator for a potential point of failure in the computing system. When the health index value of a processor is lower than a predetermined value, the scheduler may generate a message for the system administrator indicating a loss of performance and a potential component failure. The system administrator may take a remedial action to avoid the loss of performance and/or a complete failure of the computing system.

Figure 4:
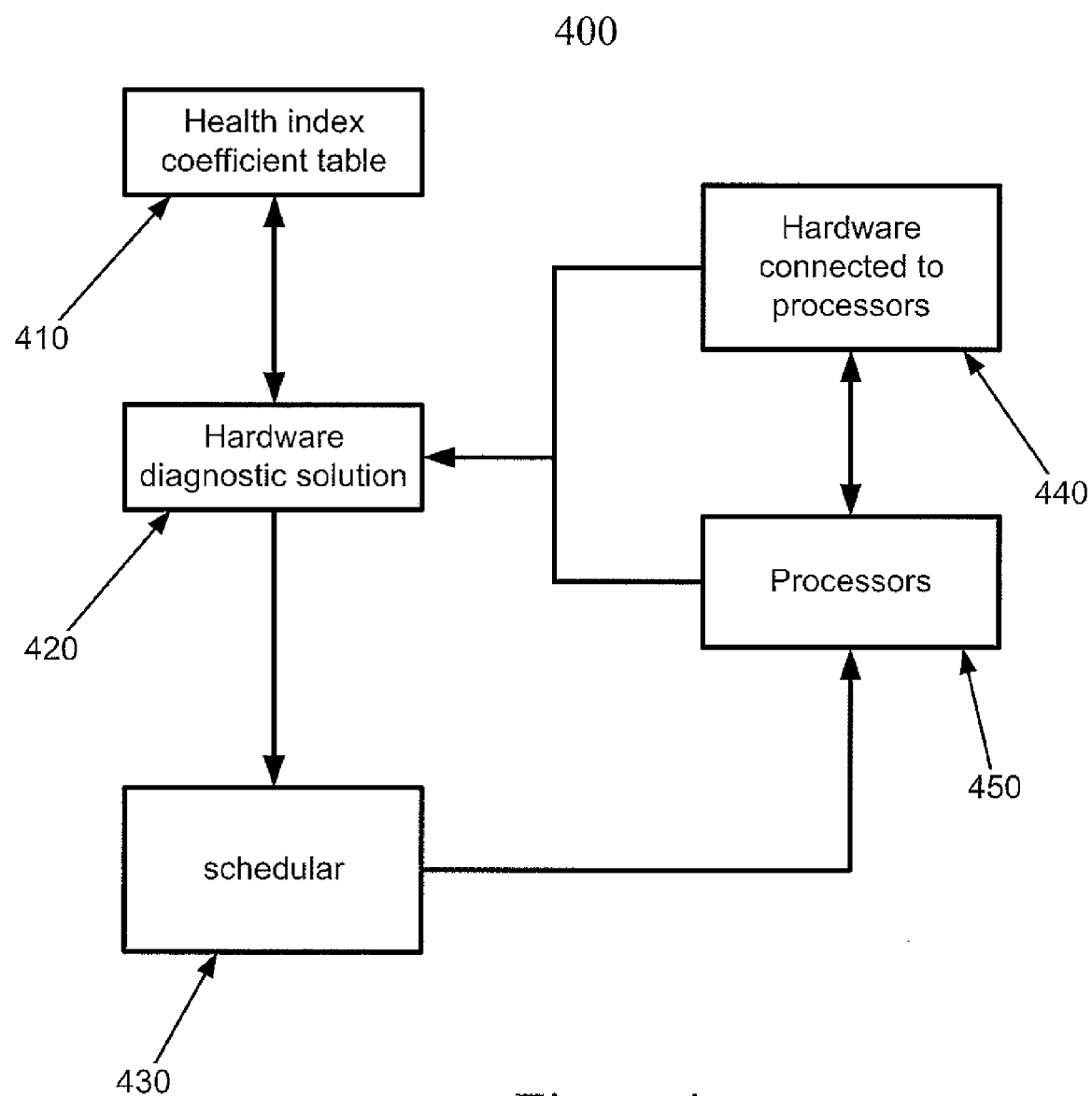
FIG. 4 is a multi processing computing system configured to schedule tasks according to an embodiment of the invention.

FIG. 4 is a diagrammatic view 400 of a multi processor computing system for scheduling tasks based on the health index value of the plurality of processors. Particularly, the diagrammatic system view of FIG. 4 illustrates a plurality of processor 450, hardware components 440 connected to the plurality of processors, a memory for storing health index coefficients table 410, a hardware diagnostic solution 420 and a scheduler 430. The hardware diagnostic solution may detect an error in the hardware components 440 and calculate the health index value for the processors using the method 300. The scheduler 430 may use the health index value for the processors for scheduling tasks on the processors.

The scheduling of tasks based on the health index value of the processor may increase the performance of the computing system under failure conditions. The health index value may also be used by the global work load manager to manage the processor resources. The health index value calculation may also decrease the probability of unscheduled downtime as the number of tasks scheduled on the erroneous components is reduced. The decrease in the unscheduled downtime of the computing system may increase the total user experience.

It will be appreciated that the various embodiments discussed herein may not be the same embodiment, and may be grouped into various other embodiments not explicitly disclosed herein. In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

Although the present embodiments have been described with reference to specific embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium). For example, the various electrical structure and methods may be embodied using transistors, logic gates, and electrical circuits (e.g., application specific integrated circuits (ASIC)).

The invention claimed is:

1. A method of scheduling tasks in a computing system having multiple processors comprising:
   receiving the tasks to be scheduled on the computing system;
   storing the tasks in a queue according to a priority associated with each of the tasks;
   assigning an initial health index value to each of the processors;
   detecting an error in a hardware component connected to at least one of the processors;
   determining whether the hardware component is connected to just one processor or more than one processor;
   based on determining that the hardware component is connected to just one processor, obtaining a health index coefficient for the detected error from a health index coefficient mapping table that maps errors to corresponding health index coefficients, and updating the health index value for that processor based on the obtained health index coefficient;
   based on determining that the hardware component is connected to more than one processor, identifying all processors connected to the hardware component, obtaining the health index coefficient for the detected error from the health index coefficient mapping table, and updating the health index value for all identified processors based on the obtained health index coefficient, wherein the health index coefficient for the detected error is based on a severity of the error and an effect of the error on the functioning of the computing system; and
   scheduling the tasks for execution on the multiple processors based on the health index values of the multiple processors and based on the priority of each task.

2. The method of claim 1 further comprising:
   resetting the health index value of a faulty processor to a maximum value when the faulty processor and all faulty hardware components connected to the faulty processor are replaced with new processor and hardware components.

3. The method of claim 1, wherein the hardware component connected to the at least one processor includes at least one of: a cache memory, a fabric interconnect, a core electronic component chip, and a processor chip.

4. The method of claim 1, wherein there are greater number of tasks that are scheduled on a processor with a higher health index value than a processor with a lower health index value.

5. The method of claim 1, further comprising:
   determining an amount of time required to process each of the scheduled tasks; and
   rescheduling a task from a processor with a lower health index value to a processor with a higher health index value when the processor with the higher health index value is not processing any tasks.

6. The method of claim 5, wherein the task from the processor with the lower health index value is rescheduled to the processor with the higher health index value when the lower health index value falls below a predetermined value.

7. The method of claim 1 further comprising sending a notification when the health index value of a processor falls below a predetermined value.

8. A non-transitory computer-readable medium containing instructions that, when executed by a processing circuit, causes the processing circuit to:
   receive tasks to be scheduled on a computing system having multiple processors;
   storing the tasks in a queue according to a priority associated with each of the tasks;
   assign an initial health index value to each of the processors;
   detect an error in a hardware component connected to at least one of the processors;
   determine whether the hardware component is connected to just one processor or more than one processor;
   based on determining that the hardware component is connected to just one processor, obtain a health index coefficient for the detected error from a health index coefficient mapping table that maps errors to corresponding health index coefficients, and update the health index value for that processor based on the obtained health index coefficient;
   based on determining that the hardware component is connected to more than one processor, identify all processors connected to the hardware component, obtaining the health index coefficient for the detected error from the health index coefficient mapping table, and update the health index value for all identified processors based on the obtained health index coefficient, wherein the health index coefficient for the detected error is based on a severity of the error and an effect of the error on the functioning of the computing system; and
   schedule the tasks for execution on the multiple processors based on the health index values of the multiple processors and based on the priority of each of the tasks.

9. A computing system, comprising:
   a memory to store a plurality of tasks to be scheduled for execution on the computing system and according to a priority associated with each of the plurality of tasks;
   a plurality of processors to execute the plurality of tasks stored on the memory;
   a plurality of hardware components connected to at least one of the plurality of processors;
   a hardware diagnostic solution to:
      assign an initial health index value to each of the plurality of processors;
      detect an error in a hardware component connected to at least one of the plurality of processors;

determine whether the hardware component is connected to just one processor or more than one processor, and based on a determination that the hardware component is connected to just one processor, obtain a health index coefficient for the detected error from a health index coefficient mapping table that maps errors to corresponding health index coefficients, and update the health index value for that processor based on the obtained health index coefficient; and based on a determination that the hardware component is connected to more than one processor, identify all processors connected to the hardware component, obtain a health index coefficient for the detected error from the health index coefficient mapping table, and update the health index value for all identified processors based on the obtained health index coefficient, wherein the health index coefficient for the detected error is based on a severity of the error and an effect of the error on the functioning of the computing system;

a scheduler to schedule the plurality of tasks for execution on the plurality of processors based on the priority of each of the plurality of tasks and based on the health index values of the plurality of processors.

\* \* \* \* \*